April 21, 1942.    J. G. PFEIFFER    2,280,448
TREATING AND TESTING APPARATUS
Filed Dec. 1, 1939

INVENTOR
J. G. PFEIFFER
BY
E. R. Nowlan
ATTORNEY

Patented Apr. 21, 1942

2,280,448

UNITED STATES PATENT OFFICE 2,280,448

TREATING AND TESTING APPARATUS

John G. Pfeiffer, Dumont, N. J., assignor to Western Electric Company, Incorporated, New York, N. Y., a corporation of New York Application December 1, 1939, Serial No. 307,123

4 Claims. (Cl. 250—27)

This invention relates to treating and testing apparatus, and more particularly to apparatus for treating and testing electrical devices and especially electronic tubes such as are used in many of the electrical arts.

In the manufacture of the many varieties and forms of electron tubes, i. e. evacuated housings of glass, metal or other materials containing a plurality of electrically conductive elements, in which use is made of an electron stream emitted by one element and received by another, with or without controlling influence from yet other elements, it is usually necessary to subject the completed principal assembly of the device to various treatments and tests before it is ready for use. For example, it is usually desirable to subject it to some form of aging treatment, in order that conditions within the tube and between its elements may become stable at predetermined values to ensure a satisfactory and reliable performance in use. During such treatments it is frequently desirable to make periodic tests of the electrical properties of the assembly, to pick out faulty ones for immediate discard, to determine which, if any, may require additional treatment, and to follow the approach of each to the required final state.

An object of the present invention is to provide an apparatus for treating and testing electron tubes, which shall be simple, compact and inexpensive in structure, and simple, convenient and reliable in use.

A further object is to provide a testing device for incorporation in such a structure which may be connected into the electrical treating circuit being applied to a tube and serve thereby to continue the treatment without substantial interruption while also serving to make measurements of and tests on the electrical properties of the tubes.

With the above and other objects in view, one embodiment of the invention may present an apparatus comprising means to removably mount a plurality of vacuum tube assemblies, and means to apply electric current to the various elements thereof for aging or other desired treatment, together with testing means applicable to each of the several assemblies in turn without substantial interruption to the treating current, for measuring predetermined electrical characteristics of the assemblies, the said testing means comprising means to impress alternatively alternating or direct current potentials upon elements of the assemblies and means to indicate and measure variations in the currents produced thereby.

Figure 1:
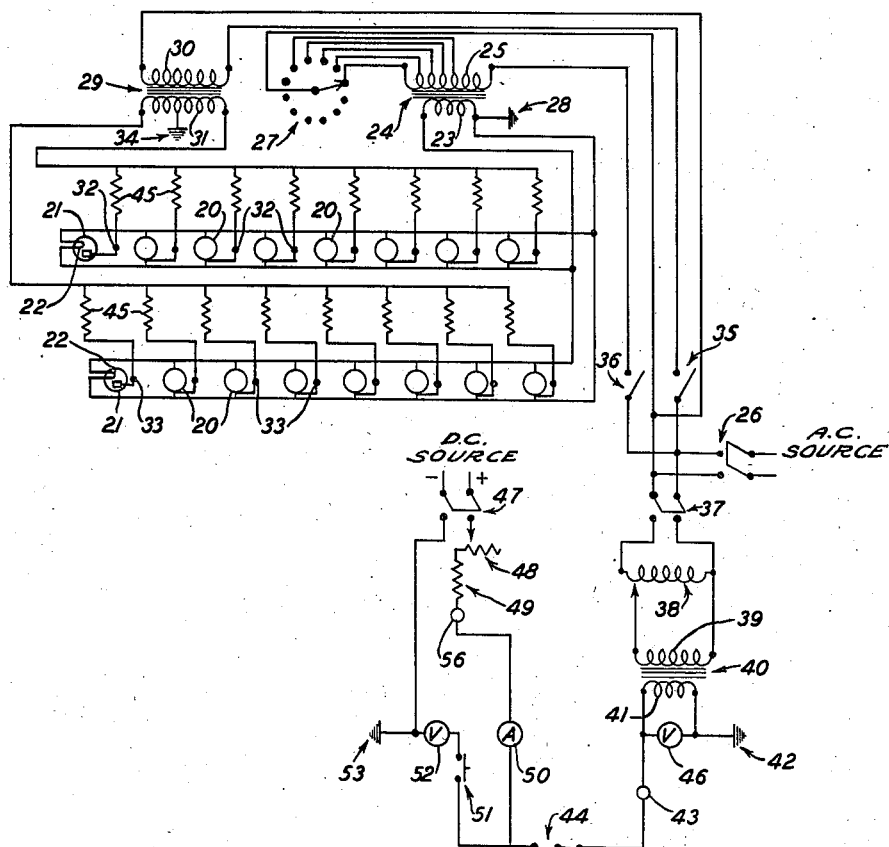
Figure 2:
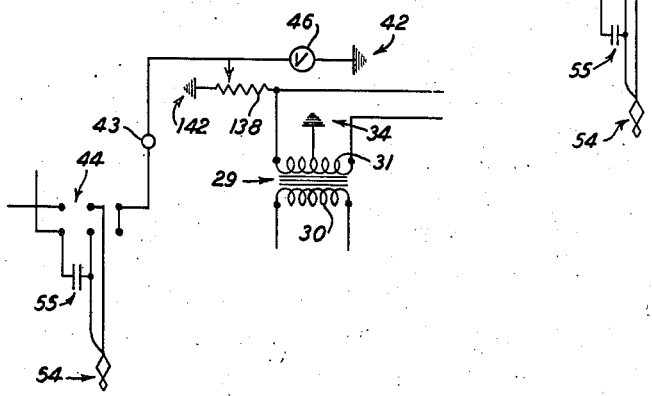

Other objects and features of the invention will appear from the following detailed description of one embodiment thereof taken in connection with the accompanying drawing in which the same reference numerals are applied to identical parts in the several figures and in which Fig. 1 is a wiring diagram of an apparatus for aging and testing diode vacuum tubes constructed in accordance with the invention; and Fig. 2 is a partial wiring diagram of a modified form thereof.

The embodiments of the invention disclosed herein are described and illustrated diagrammatically only, since the mechanical elements and arrangement are no part of the invention and comprise in essence only a framework and means to attach conventional electrical devices thereto in convenient spatial relationship to each other to permit of connecting these electrically to each other in the electrical relationship hereinafter described.

Fig. 1 presents diagrammatically an apparatus for aging diode electron vacuum tubes which have been assembled, evacuated and sealed and are to be treated to bring them to a state of equilibrium internally to be ready for immediate use and to give constant operating results. When such tubes are first subjected to operating conditions there is a period of internal readjustment during which vestigial gases adsorbed or occluded by the various parts of the tube are given off, emission of electrons from the freshly formed filaments is variable, and other changes may occur because of which the performance of the tube will be erratic at first and will gradually come to a constant value. Hence such tubes are "aged" before being put into service by being subjected to a load of the kind to be endured in service and of a magnitude in some cases the same as the normal service one or in other cases sometimes greater, and during the aging require to be tested at intervals to follow the progress of the changes.

Accordingly, the apparatus herein described comprises means such as a plurality of appropriate sockets 20 to receive and hold diode tubes 21 while being aged. The sockets are arranged in two parallel banks, conveniently having the same number of sockets. Each socket is constructed in familiar fashion to have mutually insulated contact members connecting with the two terminals of the filament 22 of a diode tube held in the socket; and these filament terminal contacts of the sockets are connected in parallel as shown in each bank of contacts. The two banks are connected in parallel across the secondary winding 23 of a transformer generally indicated at 24 whose primary winding 25 has one side connected directly to one of a pair of alternating current power mains leading from a main power control switch generally indicated at 26. The other main is variably connectible to the other side of the primary winding 25 through any suitable voltage regulating device as generally indicated at 27. One side of the secondary winding 23 is connected to ground as indicated at 28.

The mains from the switch 26 are also connected to the primary 30 of another transformer generally indicated at 29 whose secondary 31 has one side connected in parallel to a plurality of contact clips 32, one for each socket in one bank of the sockets 20. The other side of the secondary is similarly connected to similar contact members 33, one for each socket in the other bank. The middle of the winding 31 is connected to ground as indicated at 34. Each of the contact clips 32 and 33 draws current from the secondary 31 through an individual current limiting resistance 45.

The mains from the switch 26 are also connected through a separate control switch 37 and a variable voltage regulator 38 to the primary 39 of a transformer 40 whose secondary 41 is connected at 42 to ground at one side and at the other side through a ballast lamp 43 to the interconnected outer terminals at one end of a two way switch 44. An A. C. voltmeter 46 is in shunt across the secondary 41 between it and the ballast lamp.

A switch 47 is connected at its outer side to a suitable source (not shown) of direct current with polarities as indicated by the plus and minus signs. The positive terminal of this switch is connected through an adjustable resistance 48, a limiting resistance 49, a ballast lamp 56, and a D. C. ammeter 50 to one of the outer terminals of the switch 44 at the other end of the switch from those connected to the A. C. network. The other of the D. C. pair of outer terminals of the switch 44 is connected through a push button 51 and a high resistance D. C. voltmeter 52 both to ground at 53 and to the negative side of the switch 47.

A spring connector clip 54 is connected by one lead to one of the middle terminals of the switch 44 and by another lead both to the other middle terminal of this switch and to one side of a condenser 55, the other side of which is connected to the same terminal of the switch 44 to which the positive side of the switch 47 is connected.

For operation, there should preferably be at least two diode tubes in place in the sockets 20, one in each bank of the double bank shown, to develop the full efficiency of the apparatus, for a moment's inspection of the hook-up of the tube aging circuits in the upper portion of the diagram will show that each bank uses the portion of each wave of A. C. current denied passage by the other bank. In normal operation a plurality of tubes to be aged and tested is placed in the sockets 20, preferably evenly divided between the two banks. Thus the filaments of the tubes are connected through the sockets to the secondary 23 of the transformer 24. The clips 32 and 33 are attached to the respective plate terminals of the tubes which are thus connected to be supplied with current from the secondary 31 of the transformer 29. The switches 26, 35 and 36 are closed, energizing the primaries 25 and 30 of the transformers 24 and 29, respectively. The tubes are thus made to operate under substantially service conditions. This is continued for a period of time, shown by experience to be necessary for the particular type and size of the tube being aged, to bring the tubes partially to stability of operation; at which time the first of a number of tests of the tubes is made.

The tubes are tested in turn by substituting the clip 54 for the clip 32 or 33 attached to the plate of the tube in question, closing the switch 44 to the A. C. side, and closing the switch 37. The plate current is thus interrupted momentarily and immediately reapplied in the particular tube without disturbing the operation of any other tube. Should the tube be fatally defective for any reason so that it will not pass any plate current, the ballast lamp 43 will fail to light and the tube is discarded without further ado. Observation of the voltmeter 46 enables the operator to determine the critical voltage at which the plate current establishes itself, colloquially termed the breakdown voltage of the tube. By marking the permissible upper and lower limits of this voltage on the meter, a technically untrained operator can make the test reliably and quickly. Since the plate circuit of the tube in effect short circuits the secondary 41 of the transformer 40 which supplies the plate current for testing, the ballast lamp 43 has the double function of detecting complete failure of the tube to perform, and of limiting the plate current to a normal value while the tube operates under test. The variable voltage regulator 38 is provided to afford the desired testing voltage supplied by the secondary 41 of the transformer 40, as this voltage may or may not be the same as the aging voltage supplied by the transformer 29.

If the breakdown voltage of the tube is not within the desired limits, the tube may be discarded, or may be reconnected to its clip 32 or 33 and subjected to further aging and another test. If this test is satisfactory, the switch 37 is opened, the switch 44 thrown over to the D. C. side, and the switch 47 closed, to apply D. C. voltage across the plate and filament of the tube. The capacity of the tube under load is then read on the ammeter 50; and, by closing the push button 51, the operating voltage drop of the tube is read on the voltmeter 52. These meters may also be marked with upper and lower admissible limits to enable the tests to be made by a technically unskilled operator. Here also, the ballast lamp 56 serves the double function of at once reporting complete failure of the tube to operate and of providing a normal load on the plate circuit while operating. The condenser 55 acts to prevent arcing at the contacts of the switch 44 when this is opened after the tests on one tube are finished, preparatory to beginning on another tube, the switch 47 ordinarily remaining closed until a series of such tests is completed, together with the switch 37.

In some instances it is desirable that a given tube, or batch of tubes, be tested in the above described manner, several times at intervals during the aging operation, beginning in some cases before the aging process is completed in order to detect marked abnormalities in the tube during the aging which might indicate defects in the tube affecting its length of life though not affecting its performance while functioning. For this reason, as well as others, it may be important to make the tests without material interruptions of the aging procedure and to make them in such fashion that interruptions of the plate current particularly are minimized. Thus one important feature is the fact that the aging process continues without material interruption while the plurality of tests at intervals is being made. It is not merely an inconvenience to remove the tubes from the aging rack to another location for testing during the aging process, but such interruption may seriously affect both the effectiveness of the aging and the validity of the tests themselves.

However, another form, electrically a little more simple and integrated is illustrated in Fig. 2, which shows only so much of the complete network as is necessary to point out the differences from the arrangement of Fig. 1, the omitted portion being identical with Fig. 1. In the arrangement of Fig. 2, the clip 54, switch 44 and ballast lamp 43 are connected in the same manner as before through the voltmeter 46 to ground at 42. At a point between the lamp and the voltmeter, however, connection is made to the movable contact of a potentiometer or like device 138, whose main winding is connected at one end to one terminal of the secondary winding 31 of the transformer 29 and at the other end to ground at 142. Thus the A. C. testing current is drawn from the transformer 29.

Another feature of the invention is the provision of the ballast lamps 43 and 56 in series respectively between the clip 54 and the current supply switches 37 and 47. At the moment of closing either the switch 37 or 47 as described above, there is no plate current flowing and the full voltage is applied across the plate and filament. A moment later the tube "breaks down," i. e. the plate current is established and the voltage drop across the plate and filament drops abruptly to a fraction of what it was. At the same time the ballast lamp lights and imposes enough load on the suddenly released current to prevent damage thereby.

The invention has been illustrated herein as embodied in an apparatus for aging and testing diode rectifier tubes, but is not limited to such application. The modifications necessary to adapt the arrangement for use with electron tubes of other kinds or to other electrical devices subject to such treatment and simultaneous testing, are believed to be obvious. The embodiments herein disclosed are illustrative and may be modified and departed from variously without departing from the spirit and scope of the invention as pointed out in and limited only by the appended claims.

What is claimed is:

1. In an apparatus for simultaneously electrically treating and individually electrically testing a plurality of electron tubes each having a filament and a plate, means to supply electrical power independently to the filament of each one of a plurality of tubes simultaneously to heat the same, and a plurality of individual circuits each having contact means to be detachably connected to the plate of a tube to supply electrical power independently across the filament and plate of each one of the plurality of tubes simultaneously to create a plate current therein, in combination with means including an electrical measuring instrument and having contact means to be detachably connected in place of any one of the first named contact means to any one only of the plates without disturbing the others to supply electrical power across the filament and the plate of the tube while an electrical characteristic of the plate current thereof is being measured.

2. In an apparatus for simultaneously electrically treating and individually electrically testing a plurality of electron tubes each having a filament and a plate, means to supply electrical power independently to the filament of each one of a plurality of tubes simultaneously to heat the same, and a plurality of individual circuits each having contact means to be detachably connected to the plate of a tube to supply electrical power independently across the filament and plate of each one of the plurality of tubes simultaneously to create a plate current therein, in combination with means including an electrical measuring instrument and having contacts means to be detachably connected in place of any one of the first named contact means to any one only of the plates without disturbing the others to supply electrical power across the filament and the plate of the tube while an electrical characteristic of the plate current thereof is being measured, the third named means also including a ballast lamp to both indicate the establishment of the plate current of the tube and to compensate for the changes in the voltage drop across the same thereupon.

3. In an apparatus for simultaneously electrically treating and individually electrically testing a plurality of electron tubes each having a filament and a plate, means connected to a source of alternating current to supply electrical power to the filament of each of the plurality of tubes to heat the same, and a plurality of circuits connected to a source of alternating current and each having a contact member to be detachably connected to the plate terminal of one of the plurality of tubes and a second contact member to be connected to the filament of the tube to create a plate current in the tube, in combination with means connected to a source of alternating current and including an alternating current voltmeter and a contact member to be detachably connected in place of any one of the first named contact members to the plate terminal of a tube to maintain the plate current in the tube while an electrical characteristic of the plate current is being measured.

4. In an apparatus for simultaneously electrically treating and electrically testing electron tubes having a filament and a plate, means connected to a source of alternating current to supply electrical power to the filament of a tube to heat the same, means connected to a source of alternating current and having a contact member connectible to the plate terminal of the tube and to the filament of the tube to create a plate current in the tube, in combination with means connected to a source of alternating current and to the filament of the tube and including an alternating current voltmeter and a contact member connectible in place of the first named contact member to the plate terminal of the tube to create a plate current in the tube and to measure an electrical characteristic of the plate current, means connected to a source of direct current and to the filament of the tube and including a direct current ammeter and connected to the second named contact member, and means to disconnect the second named ammeter alternatively from the third named means and the fourth named means.

JOHN G. PFEIFFER.